United States Patent [19]

Immel et al.

[11] 3,859,404

[45] Jan. 7, 1975

[54] DENSIFYING PLASTIC FOAM SCRAP

[75] Inventors: Richard H. Immel, Sewickley;
George M. Dankocsik, Coraopolis;
Eugene V. Galizia, Zelionople, all of Pa.

[73] Assignee: ARCO Polymers, Inc., Philadelphia, Pa.

[22] Filed: Oct. 19, 1972

[21] Appl. No.: 299,039

[52] U.S. Cl. .................. 264/89, 264/37, 264/93, 264/321, 264/DIG. 69
[51] Int. Cl. ............................................ B29c 23/00
[58] Field of Search ........... 264/37, 88, 89, 93, 321, 264/DIG. 15, DIG. 69

[56] References Cited
UNITED STATES PATENTS

| | | | |
|---|---|---|---|
| 2,986,537 | 5/1961 | Chaumeton | 264/DIG. 15 |
| 3,026,272 | 3/1962 | Rubens | 264/53 X |
| 3,344,212 | 9/1967 | Francis | 264/321 X |
| 3,607,999 | 9/1971 | Corbett | 264/321 X |

*Primary Examiner*—Robert F. White
*Assistant Examiner*—Thomas P. Pavelko

[57] ABSTRACT

Plastic foam scrap material may be treated to convert it into a densified form. The foam scrap may be ground or chunks of scrap may be placed in a pressure vessel and exposed to heat and pressure (such as steam) followed by air pressure, and the product quenched while remaining under pressure. If desired, the scrap particles may be coated with a lubricant to eliminate agglomeration, thus facilitating the removal of the densified particles or chunks from the vessel. In most cases the densified scrap product may be recycled and used in the manner similar to the original plastic material. In the case of polystyrene foam scrap it may be densified to as high as 60 pounds per cubic foot actual density or a bulk density of about 38 pounds per cubic foot. The hydrocarbon volatile content may be reduced to less than 0.1 percent by weight. The densified polystyrene scrap product may be ground, if necessary, and after drying may be extruded, pelletized, or injection molded in much the same manner as crystal polystyrene.

1 Claim, No Drawings

DENSIFYING PLASTIC FOAM SCRAP

BACKGROUND OF THE INVENTION

The problem of disposing of plastic foam scrap is a growing one as the use of foam for packaging and other uses increases. The disposal problem for polystyrene foam scrap is perhaps greater than other plastics because of the low density of the foam and because of the fire hazard resulting from the generally used volatile blowing agents remaining in the pores of the foam. Disposal has been accomplished by using the scrap as land fill, and by incineration, or open burning. In the case of polystyrene foam its low density detracts from its use as land fill. The burning of the foam scrap is not suitable because of excessive smoke generation unless high temperature incineration is used, and this is expensive. The patent to D. V. Francis, U.S. Pat. No. 3,344,212 issued Sept. 26, 1967, uses only a heat treatment to densify foam scrap and it is stated that the final bulk density obtainable is only about 15 to 30 lbs. per cubic foot. While the Francis patent uses steam it does so in a open vessel, and there is no pressure placed on the scrap material. U.S. Pat. No. to John M. Corbett et al., U.S. Pat. No. 3,607,999 issued Sept. 21, 1971, shows a foam scrap recovery method and apparatus in which the scrap is exposed to sufficient heat to provide a sintered foam which may be passed through pressure rolls, through a cooling means, and then may be ground. In the examples given in the specification none of the examples achieve a bulk density higher than about 30.8 lbs. per cubic foot. The use of radiant heat to densify scrap is believed dangerous in view of the fumes which would be driven off and would flow toward the source of heat. It is also known that scrap can be passed through a devolatizing extruder to remove the volatile blowing agent and subsequently the product may be pelleted. A devolatizing extruder is a relatively expensive piece of equipment and would not be found in most molders plants or other places where scrap accumulates.

SUMMARY OF THE INVENTION

Chunks of foamed plastic, ground scrap, plastic particles, or even whole molded pieces of plastic foam are charged to an autoclave. Air in the vessel is removed by steam purge or vacuum, and the scrap is exposed to steam pressure for a short period of time. The steam is then replaced by air pressure for a short interval. While the air pressure is still on, the scrap is quenched, preferably by water spray, and is then removed from the autoclave. After depressuring the bulk density of the scrap, in the case of polystyrene, may be increased from less than 1 pound per cubic foot to as high as about 38 pounds per cubic foot. The actual density of the densified scrap, in the case of foamed polystyrene may be as high as 60 pounds per cubic foot, which approaches the density of unexpanded polystyrene. The densified product is suitable for land fill and has no flammable blowing agent hazard. It can also be ground, dried and recycled as a feed stock for extrusion and injection molding.

DESCRIPTION OF THE INVENTION

In accordance with the present invention, ground scrap, scrap particles, chunks of scrap or whole molded pieces of scrap may be placed in a pressure or autoclave vessel.

If desired the particles can be coated with a lubricant by pumping a solution or slurry of the lubricant through the vessel so that the particles will not become agglomerated during the subsequent treatment, and will be easier to remove from the vessel. Solutions or slurries of materials such as alkylaryl sulfonates, trisodium phosphate, tricalcium phosphate, calcium carbonate, etc., appear to be suitable lubricants.

The vessel is preferably purged with steam so that it is free of air and then is pressurized at a steam pressure of say 80 to 160 lb. per sq. inch gage for a period of a few minutes, such as, up to 10 minutes. A steam pressure of as low as 80 lb. will work satisfactorily and is a pressure which is generally available at shops, such as a molding or extrusion shop, where scrap disposal presents a problem. It is believed that higher pressures are more suitable so that the process will produce higher density materials. Also the use of higher steam pressures will reduce the time cycle for the densification of the scrap material. Air at approximately the same pressure as the prior steam pressure is preferably introduced to the vessel and the steam inlet valve closed. The purpose of the use of the air pressure is to assist in preventing re-expansion of the scrap material. The scrap is exposed to air pressure for a few minutes, such as, up to 10 minutes. While the air pressure is maintained water is sprayed into the vessel to quench and cool the scrap. The venting of the vessel removes the volatile blowing agent that has been released from the scrap by the heat of the steam. The mixture of steam and small amount of volatile blowing agent released from the scrap is safe from a flammability stand point as there is substantially no air present. Similarly the air and minute amount of volatile blowing agent is safe because the air is under pressure and the volatile to air ratio is far below the lower explosive limit. If the steam pressure were maintained and no air pressure used, when the material is quenched there would be a sudden pressure drop in the vessel and the scrap particles would have a tendency to re-expand due to the small volatile blowing agent still in the material plus the entrapped steam. For example, in a test where only steam was used, as compared to a test where steam and then air were used, prior to the quenching, the product obtained without air showed a much lower density.

The following examples are presented to illustrate the principles of the present invention but are not intended to limit the scope thereof.

Example I

Polystyrene granules having a bulk density of 1 lb. per cubic ft. were placed in a autoclave and subjected to 80 lb. steam pressure for 2½ minutes. The steam pressure was replaced with 80 lbs. air pressure. The beads were subjected to 80 lbs. of air pressure for approximately 1 minute and then during an additional minute, with the air pressure being maintained, the beads were quenched with a water spray into the pressure vessel. The resulting product had a density of 60 lbs. per cubic ft., actual density, or a bulk density of approximately 38 lbs. per cubic ft. The product was granular in form but the granules were smaller and significantly more dense. This product would be suitable for purposes of land fill.

Example II

Expandable polystyrene scrap granules having a bulk density of about 1 lb. per cubic ft. were placed in a autoclave and exposed to 120 lbs. gage of steam pressure for one minute. Air pressure of 120 lb. was imposed on the scrap in the autoclave for approximately 1 minute, and following this 80 lbs. of water pressure were used to quench the product for about 1 minute. The resultant product was a porous product having an actual density of about 46 lbs. per cubic inch but was a porous material. This material which corresponded in size to a ground condition, was pelletized, and then injection molded to form a product substantially similar in its properties to an unexpanded polystyrene.

Example III

A molded polystyrene foam pallet approximately 36 inches × 42 inches × 4 inches of a 2½ lb. per cubic ft. density was placed in a autoclave. When exposed to a steam pressure of 80 lbs. per sq. inch gage, followed by air pressure, followed by quenching, the volume of the pallet had diminished from 3.5 cubic ft. to approximately 1/24th of the prior volume, a volume of about 0.145 cubic ft. It had contracted substantially into a mass or glob of polystyrene material. Obviously, this densification is a tremendous advantage in disposing of molded foam scrap objects. When a similar pallet was placed in the autoclave and the same procedure followed except that the steam pressure and the air pressure were 130 pounds per square foot gage, the resulting glob was even smaller.

What is claimed is:

1. The method of densifying styrene polymer foam scrap materials containing small amounts of residual blowing agent which comprises:
    a. subjecting said scrap to steam in a closed vessel at a pressure of 80 to 160 pounds per square inch gage for up to 10 minutes,
    b. replacing the steam pressure with air pressure of 80 to 160 pounds per square inch gage for up to 10 minutes.
    c. quenching said scrap with a coolant while it remains subject to said air pressure; and
    d. removing said scrap from said vessel.

* * * * *